(12) United States Patent
Cammenga et al.

(10) Patent No.: US 10,179,546 B2
(45) Date of Patent: Jan. 15, 2019

(54) FULL DISPLAY MIRROR (71) Applicant: Gentex Corporation, Zeeland, MI (US)

(72) Inventors: David J. Cammenga, Zeeland, MI (US); Joel A. Stray, Hudsonville, MI (US)

(73) Assignee: GENTEX CORPORATION, Zeeland, MI (US)

(*) Notice: Subject to any disclaimer, the term of this patent is extended or adjusted under 35 U.S.C. 154(b) by 56 days.

(21) Appl. No.: 15/278,709

(22) Filed: Sep. 28, 2016

(65) Prior Publication Data

US 2017/0088055 A1 Mar. 30, 2017

Related U.S. Application Data

(60) Provisional application No. 62/235,156, filed on Sep. 30, 2015.

(51) Int. Cl.
*G02F 1/153* (2006.01)
*B60R 1/08* (2006.01)
(Continued)

(52) U.S. Cl.
CPC .............. *B60R 1/088* (2013.01); *G02F 1/155* (2013.01); *G02F 1/157* (2013.01); *G02F 1/161* (2013.01);
(Continued)

(58) Field of Classification Search
CPC ......... B60R 1/088; G02F 1/155; G02F 1/157; G02F 1/163; G02F 1/15; G02F 1/1506;
(Continued)

(56) References Cited

U.S. PATENT DOCUMENTS 3,280,701 A 10/1966 Donnelly et al.
3,837,129 A 9/1974 Losell
(Continued)

FOREIGN PATENT DOCUMENTS

EP 0434453 B1 4/1997

OTHER PUBLICATIONS

International Search Report and Written Opinion of the International Searching Authority, or the Declaration, dated Jan. 19, 2017, for International Application No. PCT/US2016/054128 filed Sep. 28, 2016, 9 pages.

*Primary Examiner* — Mahidere Sahle
(74) *Attorney, Agent, or Firm* — Price Heneveld LLP; Bradley D. Johnson (57) ABSTRACT

A display mirror assembly for a vehicle is presented that includes a full display module and an electro-optic element that includes a first substantially transparent substrate having first and second surfaces disposed on opposite sides thereof. The second surface includes a first electrically conductive layer. A second substantially transparent substrate has third and fourth surfaces disposed on opposite sides thereof. The third surface includes a second electrically conductive layer. A primary seal is disposed between the first and second substrates. The seal and the first and second substrates define a cavity therebetween. An electro-optic medium is disposed in the cavity. The electro-optic medium is variably transmissive such that the electro-optic medium is operable between generally clear and darkened states. A first electrical connection and a second electrical connection are positioned on the same side of the electro-optic element.

19 Claims, 5 Drawing Sheets

(51) Int. Cl.
*G02F 1/155* (2006.01)
*G02F 1/161* (2006.01)
*G02F 1/157* (2006.01)

(52) U.S. Cl.
CPC .. *G02F 2001/1557* (2013.01); *G02F 2203/02* (2013.01)

(58) Field of Classification Search
CPC ................ G02F 1/1521; G02F 1/1525; G02F 2001/1512; G02F 2201/44
USPC ................................ 359/245, 265, 267, 273
See application file for complete search history.

(56) References Cited

U.S. PATENT DOCUMENTS

| | | |
|---|---|---|
| 4,902,108 A | 2/1990 | Byker |
| 5,052,163 A | 10/1991 | Czekala |
| 5,066,112 A | 11/1991 | Lynam et al. |
| 5,069,535 A | 12/1991 | Baucke et al. |
| 5,073,012 A | 12/1991 | Lynam |
| 5,076,673 A | 12/1991 | Lynam et al. |
| 5,115,346 A | 5/1992 | Lynam |
| 5,253,109 A | 10/1993 | O'Farrell et al. |
| 5,379,146 A | 1/1995 | Defendini |
| 5,640,274 A | 6/1997 | Iwama et al. |
| 5,668,663 A | 9/1997 | Varaprasad et al. |
| 5,724,187 A | 3/1998 | Varaprasad et al. |
| 5,790,298 A | 8/1998 | Tonar |
| 5,818,625 A | 10/1998 | Forgette et al. |
| 6,064,508 A | 5/2000 | Forgette et al. |
| 6,102,546 A | 8/2000 | Carter |
| 6,280,041 B1 | 8/2001 | Unger |
| 6,317,248 B1 | 11/2001 | Agrawal et al. |
| 6,350,843 B1 | 2/2002 | Fa |
| 6,407,847 B1 | 6/2002 | Poll et al. |
| 7,349,143 B2 | 3/2008 | Tonar et al. |
| 8,705,161 B2 | 4/2014 | Schofield et al. |
| 2003/0227663 A1* | 12/2003 | Agrawal ........... B32B 17/10036 359/265 |
| 2013/0335800 A1* | 12/2013 | Konkin ................ C08G 73/026 359/265 |
| 2014/0139902 A1* | 5/2014 | Baumann .................. B60R 1/08 359/275 |
| 2016/0243987 A1* | 8/2016 | Kendall ................... B60R 1/088 |
| 2017/0297498 A1* | 10/2017 | Larson ...................... B60R 1/12 |

\* cited by examiner

FULL DISPLAY MIRROR

CROSS-REFERENCE TO RELATED APPLICATION

This application claims the benefit of and priority to U.S. Provisional Patent Application No. 62/235,156, filed on Sep. 30, 2015, entitled FULL DISPLAY MIRROR, the entire disclosure of which is hereby incorporated herein by reference.

FIELD OF THE DISCLOSURE

The present disclosure generally relates to vehicle mirror systems, and more specifically, to rearview mirror systems.

BACKGROUND

Vehicles typically include a rearview mirror system to allow a driver of the vehicle to observe behind the vehicle. Incorporation of display elements into rear view mirror assemblies may present dimensional constraint issues related to placement of electrical components such as connections and conductors.

SUMMARY OF THE DISCLOSURE

According to one aspect of the present disclosure, a display mirror assembly for a vehicle is presented that includes a full display module and an electro-optic element including a plurality of sides defined at a periphery of the electro-optic element. The electro-optic element includes a first substantially transparent substrate having first and second surfaces disposed on opposite sides thereof. The second surface includes a first electrically conductive layer. A second substantially transparent substrate has third and fourth surfaces disposed on opposite sides thereof. The third surface includes a second electrically conductive layer. A primary seal is disposed between the first and second substrates. The seal and the first and second substrates define a cavity therebetween. An electro-optic medium is disposed in the cavity. The electro-optic medium is variably transmissive such that the electro-optic medium is operable between generally clear and darkened states. A first electrical connection and a second electrical connection are positioned on the same side of the electro-optic element.

According to another aspect of the present disclosure, a display mirror assembly for a vehicle is presented that includes a full display module and an electro-optic element that includes a first substantially transparent substrate having first and second surfaces disposed on opposite sides thereof and a second substantially transparent substrate having third and fourth surfaces disposed on opposite sides thereof. A primary seal is disposed between the first and second substrates. A first conductor is positioned along a top of the electro-optic element between the first and second substrates and electrically coupled to a first electrical connection. A second conductor is positioned between the first and second substrates with the second conductor electrically coupled to a second electrical connection and an electrically conductive layer. The second conductor is electrically coupled to the second electrical connection on a different side of the electro-optic element than the electrically conductive layer.

According to yet another aspect of the present disclosure, a display mirror assembly for a vehicle is presented that includes a full display module and an electro-optic element positioned vehicle forward of the full display module. The electro-optic element includes a first substantially transparent substrate, a second substantially transparent substrate, an electro-optic medium positioned between the first and second substrates, and a first electrical connection and a second electrical connection positioned on a same side of the electro-optic element. A first conductor is electrically coupled with the first electrical connection and a second conductor is electrically coupled to the second electrical connection. The first conductor and the second conductor are electrically coupled with the electro-optic medium on opposite sides of the electro-optic element.

According to yet another aspect of the disclosure, a display mirror is provided which offers increased flexibility in design, decreased component size, increased aesthetic appeal to a viewer, and uniform transitioning of an electro-optic medium between a clear and darkened state regardless of where electricity coupled to the display mirror.

These and other aspects, objects, and features of the present invention will be understood and appreciated by those skilled in the art upon studying the following specification, claims, and appended drawings.

DETAILED DESCRIPTION OF THE EMBODIMENTS

Figure 1:
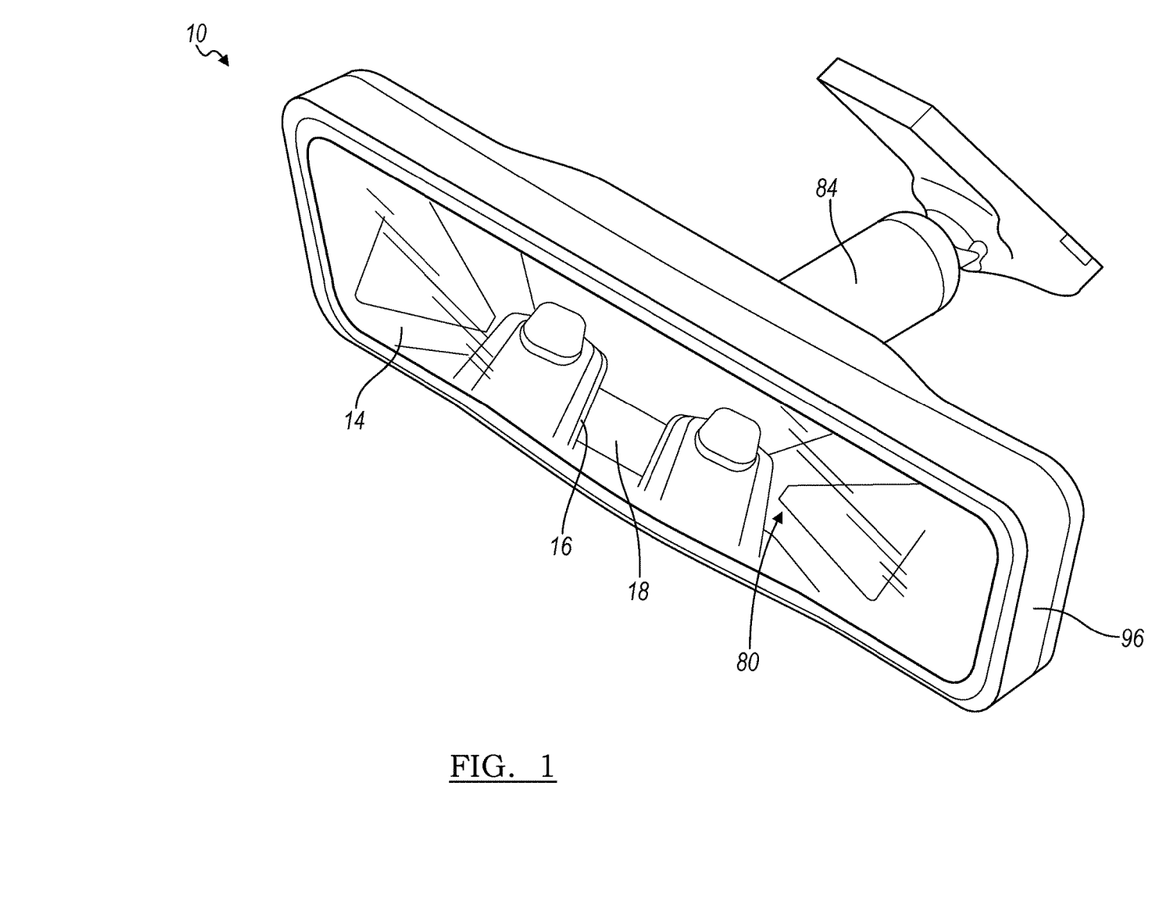
FIG. 1 is a top front perspective view of a display mirror assembly for a vehicle, according to one embodiment.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting unless the claims expressly state otherwise.

Referring to FIGS. 1-4C, reference numeral 10 generally designates a display mirror assembly for a vehicle including a full display module 12 and an electro-optic element 14. The electro-optic element 14 includes a plurality of sides defined at a periphery of the electro-optic element 14. The electro-optic element 14 includes a first substantially transparent substrate 16 having a first surface 18 and a second surface 22 disposed on opposite sides thereof. The second surface 22 includes a first electrically conductive layer 26. A second substantially transparent substrate 30 includes a third surface 34 and a fourth surface 38 disposed on opposite sides thereof. The third surface 34 includes a second electrically conductive layer 42. A primary seal 46 is disposed between the first and second substrates 16, 30, wherein the seal 46 and the first and second substrates 16, 30 define a cavity 50 therebetween. An electro-optic medium 54 is disposed in the cavity 50. The electro-optic medium 54 is variably transmissive such that the electro-optic element 14 is operable between generally clear and darkened states. A first electrical connection 58 and a second electrical connection 62 are positioned on a same side of the electro-optic element 14.

The electro-optic element 14, as described and depicted herein, may include a plurality of sides. Sides of the electro-optic element 14 may be longitudinal extents, either curved or substantially linear, which are separated by corners (e.g., abrupt changes of direction greater than about 10°. For example, a rectangular shape of the electro-optic element 14 (as depicted), includes four sides (i.e., top, bottom, and two sides), however electro-optic elements 14 having an oval shape (e.g., two sides), round shape (e.g., one side), or shapes with greater than four sides (e.g., pentagon) are considered.

Figure 2:
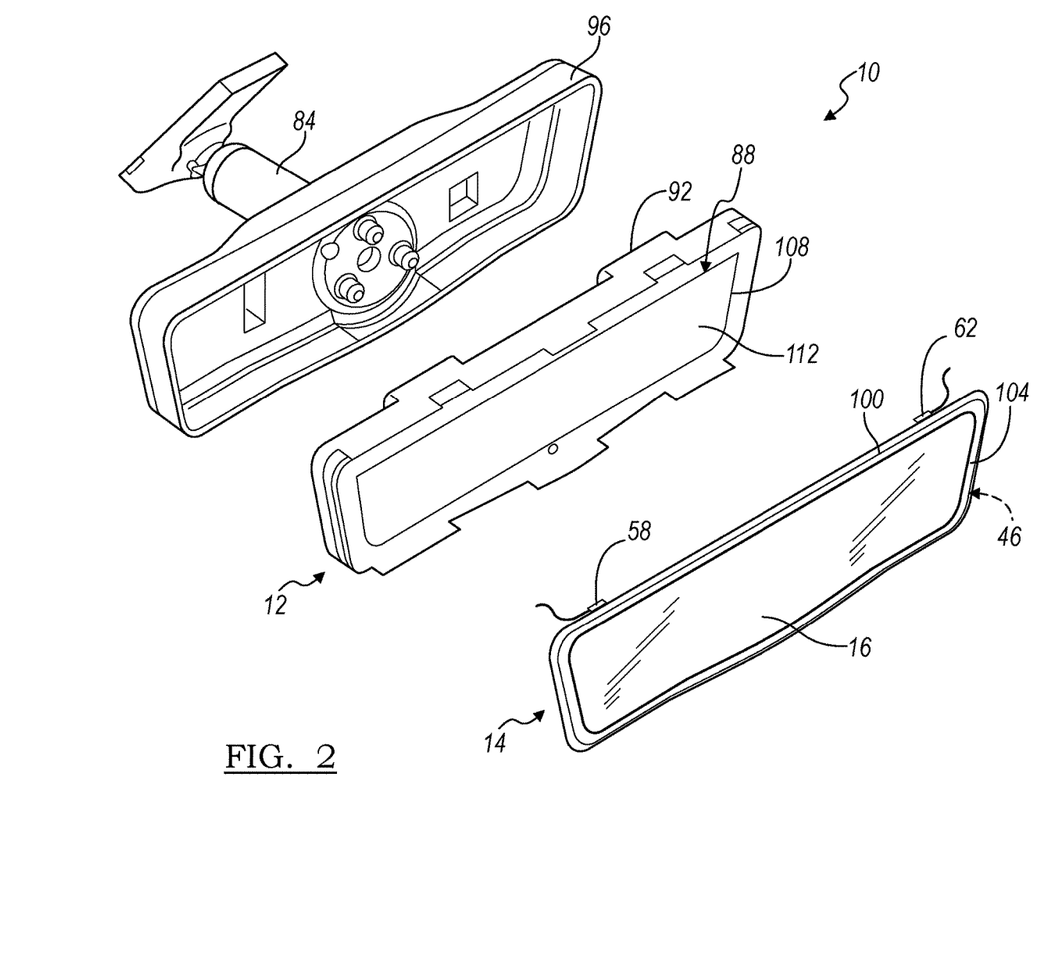
FIG. 2 is a partially exploded top perspective view of the display mirror assembly of FIG. 1, according to one embodiment.
Figure 3A:
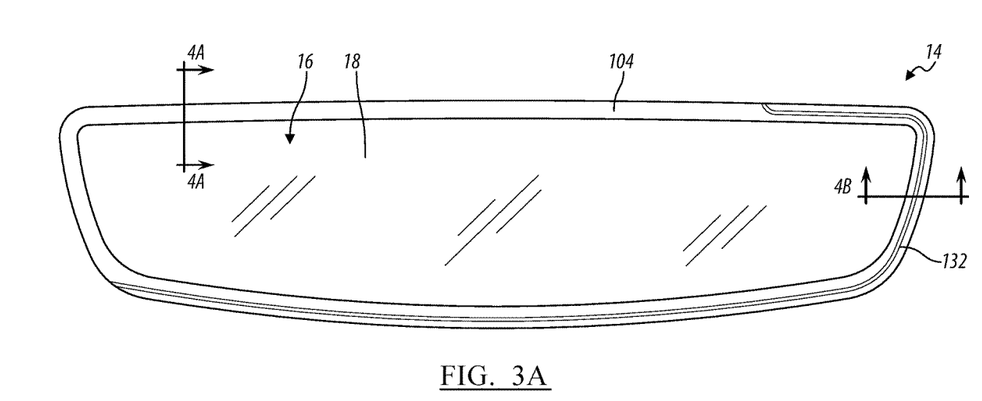
FIG. 3A is a front plan view of an electro-optic element of the display mirror, according to one embodiment.
Figure 3B:
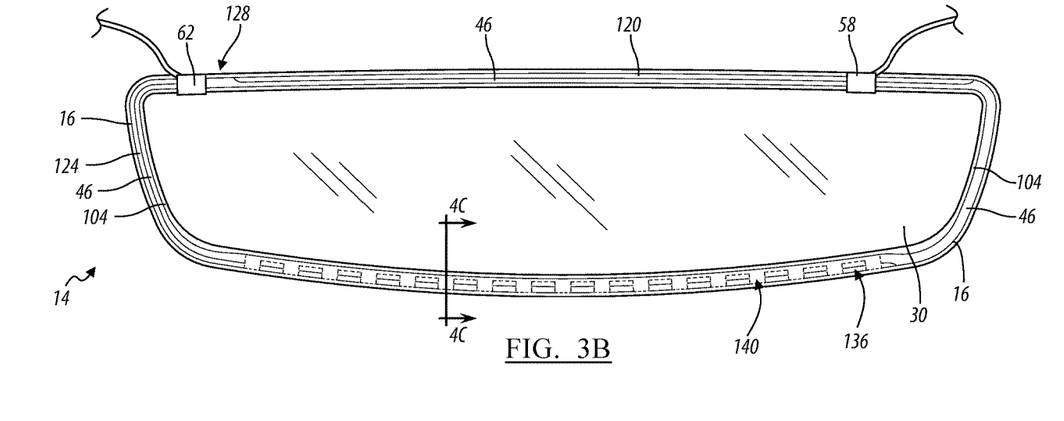
FIG. 3B is a rear plan view of the electro-optic element of the display mirror, according to one embodiment.

Referring generally to FIGS. 1 and 2, the display mirror assembly 10 has a viewing area 80, which includes the first surface 18 of the electro-optic element 14. The viewing area 80 may be a rectangular shape, a trapezoidal shape, or any custom contoured shape desired for aesthetic reasons. The display mirror assembly 10 may be mounted to a vehicle via a mounting member 84 extending rearwardly from the display mirror assembly 10.

Referring to FIG. 2, the display mirror assembly 10 for a vehicle is shown, with the components partially exploded. The display mirror assembly 10 includes the electro-optic element 14, a front shield 88 and a rear shield 92 encapsulating the full display module 12, a rear housing 96, and the mounting member 84. In one embodiment, the full display module 12 may be manufactured similarly to that described in U.S. Patent Application Publication No. 2014/0268355 A1, which is herein incorporated by reference in its entirety. For purposes of this disclosure, a "full" display module 12 is a module where the display module 12 is at least about 70%, at least about 75%, at least about 80%, at least about 85%, at least about 90%, at least about 95% or at least about 99% of the total display surface of the display mirror assembly 10. Referring again to the depicted embodiment, the front shield 88, the rear shield 92, and components of the full display module 12 include various retaining features to operably connect the several components of the full display module 12 with the front shield 88, the rear shield 92 and each other, and to provide support to the full display module 12. Specifically, the front shield 88 includes retaining features to operably connect the front shield 88 to the full display module 12, and the rear shield 92 has retaining features to operably connect the rear shield 92 to the full display module 12. The retaining features may include snap-fit connections, tab and slot connections, screw connections, and other known retaining features. Some or all of the retaining features may also be strengthened by the addition of adhesive compounds.

As shown in the depicted embodiment of FIG. 2, the electro-optic element 14 is generally planar, with an outer perimeter 100 and a spectral filter 104 around the outer perimeter 100. The spectral filter 104 may incorporate a hiding layer such as a chrome ring or other similar finish to conceal the front shield 88 and other elements located within and/or behind the electro-optic element 14 in the display mirror assembly 10, including, without limitation, the primary seal 46 on an electrochromic unit, an applique, foam adhesive, pad printing, etc. The spectral filter 104 may extend from the outer perimeter 100 of the electro-optic element 14 to an outer edge 108 of the full display module 12. Alternatively, the spectral filter 104 may be narrower and not reach from the outer perimeter 100 to the outer edge 108 of the full display module 12 along at least some portions of the spectral filter 104. The perimeter of the first substrate 16 of the electro-optic element 14 may also have a ground edge, a beveled edge, a seamed edge, a laser cut edge, or combinations thereof.

Still referring to FIG. 2, the front shield 88 functions to shield the full display module 12 from radio frequency (RF) electromagnetic radiation and to provide support for the electro-optic element 14 and the full display module 12. The front shield 88 is formed from one or more materials which are suitable to block RF radiation including, without limitation, steel. As a non-limiting example, the front shield 88 can be formed from a stamped steel material which may be about 0.2 mm thick. The full display module 12 is disposed behind the front shield 88, with a display screen 112 viewable through an opening in the front shield 88. The display module 12 may be LCD, LED, OLED, plasma, DLP or other display technology. Further, the display module 12 may incorporate one or more light guides.

Referring now to FIGS. 3A, 3B, 4A, and 4B, the second substrate 30 is slightly smaller than the first substrate 16 which results in a relatively small offset between the first and second substrates 16, 30. Such an embodiment may be advantageous in concealing the first and second electrical connections 58, 62 as well as for providing a distinct edge to the electro-optic element 14. In various embodiments, the first and second electrical connections 58, 62 may be an electrical clip, such as a J-clip, or include multiple electrical connection components such as a male to female connection. The primary seal 46 traverses an approximate perimeter of, and is configured to, cooperate with the first and second substrates 16, 30 to define the cavity 50 between the first and second substrate 16, 30. In various embodiments, the cavity 50 may be substantially hermetic. In various embodiments, the primary seal 46 may be applied to the first or second substrates 16, 30 by methods commonly used in the liquid crystal display (LCD) industry, such as by silk-screening or dispensing. The spectral filter 104 extends inboard from the primary seal 46 into the cavity 50 sufficiently far enough to generally conceal the primary seal 46 from the viewer.

Figure 4A:
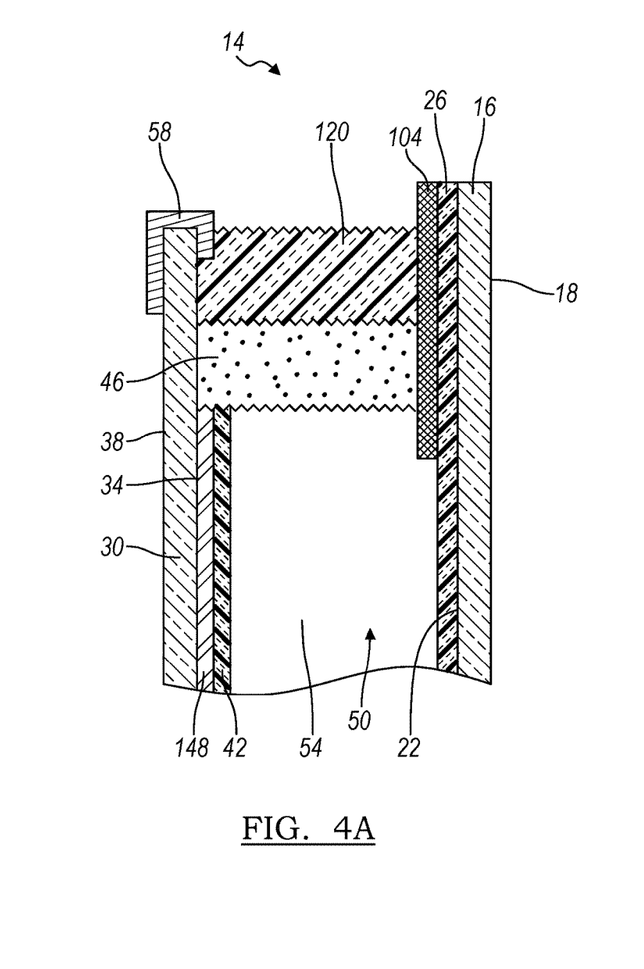
FIG. 4A is a cross-sectional view of the electro-optic element taken at line 4A of FIG. 3A, according to one embodiment.
Figure 4B:
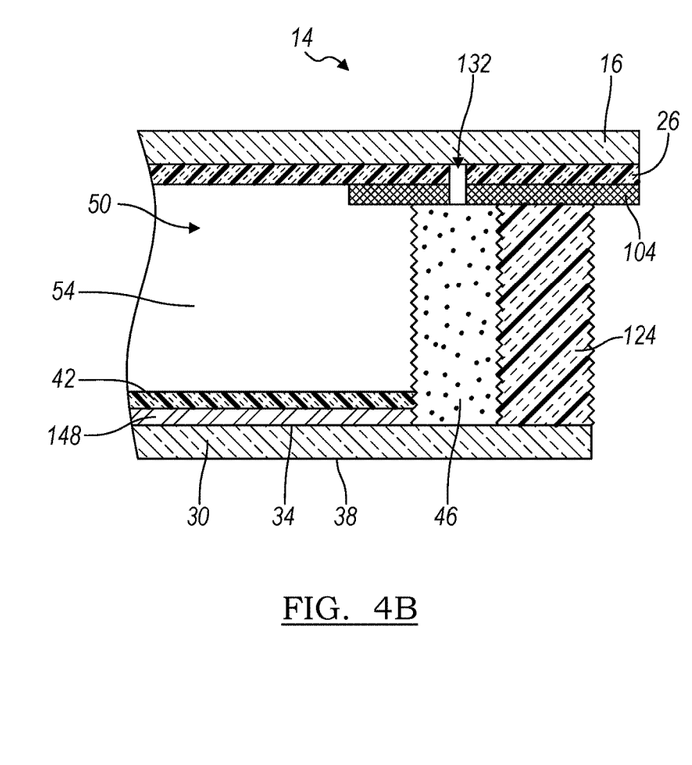
FIG. 4B is a cross-sectional view of the electro-optic element taken at line 4B of FIG. 3A, according to one embodiment.
Figure 4C:
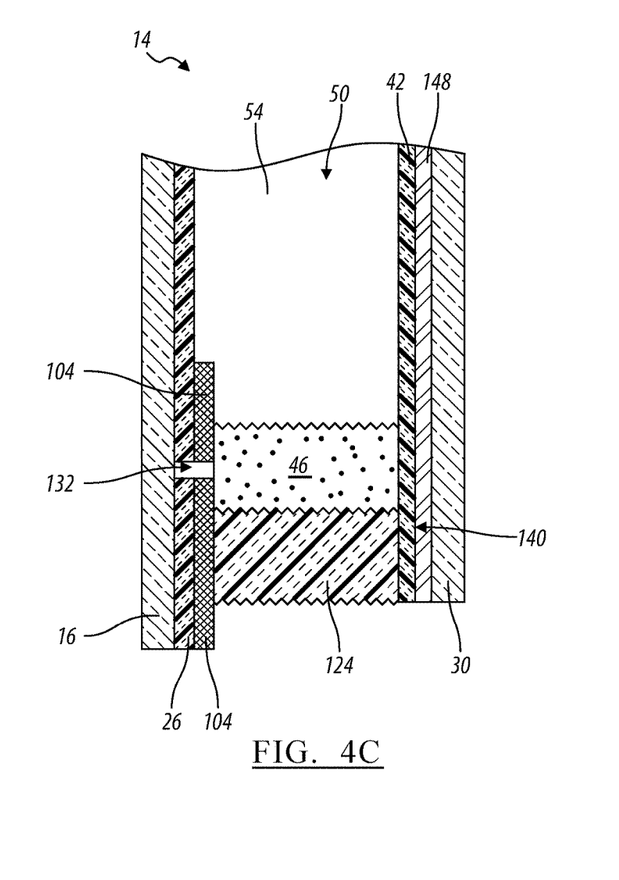
FIG. 4C is a cross-sectional view of the electro-optic element taken at line 4C of FIG. 3C, according to one embodiment.

Referring now to FIGS. 4A-C, the electro-optic medium 54 is disposed within the cavity 50. In various embodiments, the electro-optic element 14 may be an electrochromic element. In such embodiments, the electro-optic medium 54 may be an electrochromic medium, which includes at least one solvent, at least one anodic material, and at least one cathodic material. Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference. Electrochromic components, as described herein, include materials whose color or opacity are affected by electric current, such that when an electrical field is applied to the material, the color or opacity changes from a first phase to a second phase. The electrochromic component may be a single-layer, single-phase component, multi-layer component, or multi-phase component, as described in U.S. Pat. No. 5,928,572 entitled "ELECTROCHROMIC LAYER AND DEVICES COMPRISING SAME," U.S. Pat. No. 5,998,617 entitled "ELECTROCHROMIC COMPOUNDS," U.S. Pat. No. 6,020,987 entitled "ELECTROCHROMIC MEDIUM CAPABLE OF PRODUCING A PRE-SELECTED COLOR," U.S. Pat. No. 6,037,471 entitled "ELECTROCHROMIC COMPOUNDS," U.S. Pat. No. 6,141,137 entitled "ELECTROCHROMIC MEDIA FOR PRODUCING A PRE-SELECTED COLOR," U.S. Pat. No. 6,241,916 entitled "ELECTROCHROMIC SYSTEM," U.S. Pat. No. 6,193,912 entitled "NEAR INFRARED-ABSORBING ELECTROCHROMIC COMPOUNDS AND DEVICES COMPRISING SAME," U.S. Pat. No. 6,249,369 entitled "COUPLED ELECTROCHROMIC COMPOUNDS WITH PHOTOSTABLE DICATION OXIDATION STATES," and U.S. Pat. No. 6,137,620 entitled "ELECTROCHROMIC MEDIA WITH CONCENTRATION ENHANCED STABILITY, PROCESS FOR THE PREPARATION THEREOF AND USE IN ELECTROCHROMIC DEVICES;" U.S. Pat. No. 6,519,072 entitled "ELECTROCHROMIC DEVICE;" and International Patent Application Serial Nos. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," PCT/EP98/03862 entitled "ELECTROCHROMIC POLYMER SYSTEM," and PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," which are herein incorporated by reference in their entirety.

Still referring to FIGS. 3A, 3B, 4A, and 4B, a first conductor 120 and a second conductor 124 are disposed around a portion of a perimeter of the electro-optic element 14. The first and second conductors 120, 124 are positioned outboard of the primary seal 46 and serve to electrically connect the first electrical connection 58 to the first electrically conductive layer 26 and the second electrical connection 62 to the second electrically conductive layer 42. In various embodiments, the first and second electrically conductive layers 26, 42 may be formed of indium tin-oxide, aluminum-doped zinc-oxide and indium-doped cadmium-oxide, carbon nanotubes, graphene, or combinations thereof. In various embodiments, the second electrically conductive layer 42 may include a metal reflector or one or more coatings configured as any of the partially reflective, partially transmissive ("transflective") coatings disclosed in U.S. Pat. No. 6,700,692, the entire disclosure of which is incorporated herein by reference. By way of example and not limitation, the first and second conductors 120, 124 may be a conductive solder, a conductive epoxy (e.g., silver epoxy), a wire, metal solder, ultrasonic solder, conductive ink, conductive frit and/or other material capable of electrical transfer. In some embodiments, the first and second conductors 120, 124 are different materials. In the depicted embodiment, the first conductor 120 extends along a top perimeter of the electro-optic element 14, on both sides of the first electrical connection 58, but in other embodiments may only extend from a single side of the first electrical connection 58. The first conductor 120 is electrically coupled with the spectral filter 104 which provides electrical connection to the first electrically conductive layer 26. Positioned between the first conductor 120 and the second electrical connection 62 is an isolation gap 128. At the isolation gap 128, the thickness of the primary seal 46 expands and functions to prevent a short in the path of electricity through the electro-optic element 14. The isolation gap 128 may have a length of greater than about 0.1 cm, greater than about 0.5 cm, greater than about 1.0 cm, greater than about 1.5 cm, greater than about 2.0 cm, greater than about 2.5 cm, greater than about 3.0 cm, greater than about 3.5 cm or greater than about 4 cm. Alternatively, the isolation gap 128 may have a length of less than about 30 mm.

The second conductor 124 is in electrical communication with the second electrical connection 62. In the depicted embodiment, the second conductor 124 begins at the second electrical connection 62 and extends along a side and bottom of the electro-optic element 14. Along the length of the second conductor 124, an isolation line 132 is disposed through the first electrically conductive layer 26 and the spectral filter 104. The isolation line 132 is configured to electrically separate the second conductor 124 from the first electrically conductive layer 26. The isolation line 132 is depicted as disposed over the primary seal 46, but may be positioned in a variety of locations that electrically separate the second conductor 124 from the first electrically conductive layer 26. The isolation line 132 may be formed via laser ablation of the spectral filter 104 and first electrically conductive layer 26 or may be formed via selective application of the spectral filter 104 and first electrically conductive layer 26. The isolation line 132 may have a thickness of less than about 40μ, less than about 30μ, less than about 20μ, less than about 15μ, less than about 14μ, less than about 13μ, less than about 12μ, less than about 11μ, less than about 10μ, less than about 9μ, less than about 8μ, less than about 7μ, less than about 6μ or less than about 5μ. In some embodiments, the isolation line 132 may be of a sufficiently small width that the isolation line 132 is not perceptible to the human eye. In other embodiments, the isolation line 132 may extend around the electro-optic element 14 such that the isolation line 132 has aesthetically pleasing reflection symmetry across the electro-optic element 14.

Portions of the second electrically conductive layer 42 and a film 148 positioned on the third surface 34 may be continuously ablated along the perimeter of the electro-optic element 14 and ablated at a bottom side of the electro-optic element 14 to form a "saw tooth" pattern. In the illustrated embodiment, the conductive layer 42 and the film 148 define a plurality of openings 136 and a multitude of contacts 140. The ablated perimeter of the electro-optic element 14 and the plurality of openings 136 allow the primary seal 46, the first conductor 120 and/or the second conductor 124 to be viewed and inspected for defects (e.g., gaps or holes). The contacts 140 extend over the primary seal 46 toward the second conductor 124. The contacts 140 are electrically coupled to the second conductor 124, thereby facilitating electrical coupling between the second conductor 124 and the second electrically conductive layer 42. Use of the ablation and contacts 140 allows for a largely uniform application of electricity to the electro-optic medium 54 which facilitates an even transition between clear and darkened states of the electro-optic medium 54 in electrochromic embodiments of the electro-optic element 14. The largely uniform application of electricity to the electro-optic medium 54 facilitates the even transition between the clear and darkened states by ensuring that portions of the electro-optic medium 54 do not darken faster than other portions.

Referring now to FIG. 4A-C, the electro-optic element 14 may include the film 148 positioned on the third surface 34. The film 148 may be reflective, transmissive, or may have a combination of partially reflective and partially transmissive properties. In such an embodiment, use of the film 148 may allow a viewer of the display mirror assembly 10 to view the full display module 12 (FIG. 2) while it is active (e.g., emitting light), but also perceive the film 148 as a reflective mirror while the full display module 12 is off (e.g., not emitting light) due to the reflective properties of the film 148.

The use of this disclosure (e.g., the first and second conductors 120, 124 on the same side, the isolation line 132, and the conductive bus 136) allows a variety of advantages to be realized. For example, use of the disclosed first and second conductors 120, 124 may allow designers of the electro-optic element 14 to decouple where electricity enters the electro-optic element 14 from where the electricity enters the electro-optic medium 54. Typically, in traditional electro-optic elements, electrical connections must be placed on opposite sides of the element in order to achieve a uniform change across the element. This disclosure is advantageous in that it may allow use of a smaller bezel, frame or housing around the electro-optic element 14 due to optimum placement of the first and second electrical connections 58, 62, while still channeling electricity to the electro-optic medium 54 in a way that facilitates even transitioning of the electro-optic medium 54 between clear and darkened states. Additionally, use of the first and second conductors 120, 124 allow for flexibility in the design of the display mirror assembly 10 by allowing the movement of the first and second electrical connections 58, 62 to areas proximate less moveable connections. For example, the full display module 12 may have a display connector protruding from a top of the full display module 12. In such an example, the first and second conductors 120, 124 may be utilized so that all electrical connections (e.g., the display connector for the full display module 12 and the first and second electrical connections 58, 62) are positioned on a single side (e.g., the top side) of the display mirror assembly 10, thereby allowing a thinner profile elsewhere around the display mirror assembly 10. Additionally, use of the first and second conductors 120, 124 may allow for a radio frequency shield (e.g., front shield 88 and rear shield 92) and/or allow fewer or smaller openings to be made through the shield.

It will be understood that although placement of the first and second conductors 120, 124 has been discussed and shown herein, the first and second conductors 120, 124 may be positioned in a variety of locations around the electro-optic element 14. For example, the first and second electrical connections 58, 62 may be located on a side of the electro-optic element 14 (e.g., on each side of a fill port) with the first and second conductors 120, 124 extending in opposite directions along sides of the electro-optic element 14.

The present disclosure may be used with a rearview assembly such as that described in U.S. Pat. Nos. 8,925,891; 8,814,373; 8,201,800; and 8,210,695; U.S. Patent Application Publication Nos. 2014/0063630 and 2012/0327234; and U.S. Provisional Patent Application Nos. 61/709,716; 61/707,676; and 61/704,869, which are hereby incorporated herein by reference in their entirety. Further, the present disclosure may be used with a rearview packaging assembly such as that described in U.S. Pat. Nos. 8,885,240; 8,814,373; 8,646,924; 8,643,931; and 8,264,761; and U.S. Provisional Patent Application Nos. 61/707,625 and 61/590,259, which are hereby incorporated herein by reference in their entirety. Additionally, it is contemplated that the present disclosure can include a bezel such as that described in U.S. Pat. Nos. 8,827,517; 8,210,695; and 8,201,800, which are hereby incorporated herein by reference in their entirety.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components, electrical or mechanical, and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and, further, it is to be understood that such concepts are intended to be covered by the following claims unless these claims, by their language, expressly state otherwise.

What is claimed is:

1. A display mirror assembly for a vehicle, comprising:
a full display module; and an electro-optic element including a plurality of sides defined at a periphery of the electro-optic element, the electro-optic element comprising:
a first substantially transparent substrate having first and second surfaces disposed on opposite sides thereof, wherein the second surface comprises a first electrically conductive layer;
a second substantially transparent substrate having third and fourth surfaces disposed on opposite sides thereof, wherein the third surface comprises a second electrically conductive layer;
a primary seal disposed between the first and second substrates, wherein the seal and the first and second substrates define a cavity therebetween;
an electro-optic medium disposed in the cavity, the electro-optic medium being variably transmissive such that the electro-optic medium is operable between generally clear and darkened states;
a spectral filter positioned on the first electrically conductive layer;
a first electrical connection and a second electrical connection, wherein the first and second electrical connections are each positioned on a same side of the second substrate;
a first conductor in electrical communication with the first electrical connection, wherein the first conductor extends between the spectral filter and the third surface of the second substrate;
a second conductor in electrical communication with the second electrical connection, wherein the second conductor extends between the spectral filter and the third surface of the second substrate; and
an isolation line is disposed through the first electrically conductive layer, wherein the isolation line is configured to electrically separate the second conductor from the first electrically conductive layer between the second electrical connection and an opposite side of the electro-optic element.

2. The display mirror assembly of claim 1, wherein the electro-optic element is partially transmissive and partially reflective.

3. The display mirror assembly of claim 1, wherein the full display module is positioned vehicle forward of the electro-optic element.

4. The display mirror assembly of claim 1, wherein the first electrical connection is electrically coupled with a first conductor and the second electrical connection is electrically coupled with a second conductor.

5. The display mirror assembly of claim 4, wherein the second conductor extends to an opposite side of the electro-optic element than the first electrical connection.

6. The display mirror assembly of claim 5, wherein the first and second conductors are positioned outboard of the primary seal.

7. A display mirror assembly for a vehicle, comprising:
a full display module; and
an electro-optic element comprising:
a first substantially transparent substrate having first and second surfaces disposed on opposite sides thereof;
a second substantially transparent substrate having third and fourth surfaces disposed on opposite sides thereof;
a primary seal disposed between the first and second substrates;
a first conductor positioned along a top of the electro-optic element between the first and second substrates and electrically coupled to a first electrical connection and a first electrically conductive layer;
a second conductor positioned between the first and second substrates, the second conductor electrically coupled to a second electrical connection and a second electrically conductive layer, wherein the second conductor is electrically coupled to the second electrical connection on a different side of the electro-optic element than the second electrically conductive layer; and
an isolation line is disposed through the first electrically conductive layer, wherein the isolation line is configured to electrically separate the second conductor from the first electrically conductive layer between the second electrical connection and an opposite side of the electro-optic element.

8. The display mirror assembly of claim 7, wherein the isolation gap has a length less than about 50 mm.

9. The display mirror assembly of claim 8, wherein an isolation gap is defined between the first conductor and the second electrical connection, the isolation gap having a length less than about 30 mm.

10. The display mirror assembly of claim 7, wherein the first and second electrical connections are positioned on a top side of the electro-optic element.

11. The display mirror assembly of claim 7, wherein the second conductor is electrically coupled to the second electrically conductive layer via a conductive bus.

12. The display mirror assembly of claim 7, wherein the first conductor is electrically coupled to a spectral filter positioned on the first substrate.

13. The display mirror assembly of claim 7, wherein the full display module extends over at least 70% of a display surface of the display mirror assembly.

14. The display mirror assembly of claim 7, wherein the first and second conductors are positioned outboard of the primary seal.

15. A display mirror assembly for a vehicle, comprising:
a full display module; and
an electro-optic element positioned vehicle forward of the full display module, the electro-optic element comprising:
a first substantially transparent substrate;
a second substantially transparent substrate;
an electro-optic medium positioned between the first and second substrates;
a first electrical connection and a second electrical connection each positioned on a same side of the second substrate;
a first conductor electrically coupled with an electrically conductive layer positioned on the first substrate and with the first electrical connection and a second conductor electrically coupled to the second electrical connection, wherein the first conductor and the second conductor are electrically coupled with the electro-optic medium on opposite sides of the electro-optic element;
an isolation gap is defined between the first conductor and the second electrical connection; and
an isolation line disposed through the electrically conductive layer and extending along and proximate to the second conductor and a perimeter of the electro-optic.

16. The display mirror assembly of claim 15, wherein the electro-optic element is partially transmissive and partially reflective.

17. The display mirror assembly of claim 15, wherein the first and second conductors are positioned outboard of a primary seal.

18. The display mirror assembly of claim 15, wherein the first and second electrical connections are positioned on a top side of the electro-optic element.

19. The display mirror assembly of claim 15, wherein the second conductor is electrically coupled to a second electrically conductive layer positioned on the second substrate via a conductive bus.

* * * * *